United States Patent
Kim

(10) Patent No.: US 11,091,005 B2
(45) Date of Patent: Aug. 17, 2021

(54) VENTILATION BED FOR VEHICLE AND METHOD FOR CONTROLLING THE SAME

(71) Applicants: Hyundai Motor Company, Seoul (KR); Kia Motors Corporation, Seoul (KR)

(72) Inventor: SangJun Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 379 days.

(21) Appl. No.: 16/210,204

(22) Filed: Dec. 5, 2018

(65) Prior Publication Data
US 2019/0105962 A1   Apr. 11, 2019

Related U.S. Application Data

(62) Division of application No. 14/839,313, filed on Aug. 28, 2015, now Pat. No. 10,179,497.

(30) Foreign Application Priority Data

Feb. 27, 2015 (KR) .................. 10-2015-0028523

(51) Int. Cl.
*B60H 1/00* (2006.01)
*G06F 3/0487* (2013.01)
(Continued)

(52) U.S. Cl.
CPC ..... *B60H 1/00378* (2013.01); *B60H 1/00271* (2013.01); *B60H 2001/003* (2013.01);
(Continued)

(58) Field of Classification Search
CPC .............. A47C 21/044; B60H 1/00271; B60H 1/00378; B60H 1/00871; B60H 2001/003;
(Continued)

(56) References Cited

U.S. PATENT DOCUMENTS

| 5,570,996 A | 11/1996 | Smiley |
|---|---|---|
| 6,470,960 B2 | 10/2002 | Kampf |

(Continued)

FOREIGN PATENT DOCUMENTS

| CN | 102342686 A | 2/2012 |
|---|---|---|
| DE | 3636108 A1 | 10/1986 |

(Continued)

OTHER PUBLICATIONS

Machine Translation: DE 3636108 A1 Machine Translation: JP 2009236353 A.

*Primary Examiner* — Edward F Landrum
*Assistant Examiner* — Chang H Park
(74) *Attorney, Agent, or Firm* — Morgan, Lewis & Bockius LLP

(57) ABSTRACT

A method of controlling a ventilation bed having an airflow control apparatus to selectively deliver a required amount of air supplied from an air conditioning system into a region of a pad divided into a plurality of regions, a switch to select at least a portion among the regions of the pad, an airflow control portion to be rotatable and that regulates a total amount of the air discharged therefrom, includes detecting, by pressure detecting sensors, whether a pressure is applied on the regions of the pad or not, when an automatic mode is selected by a switch, determining a relative pressure ratio value of the regions of the pad, by a control portion, when the pressure is applied on the pad, and regulating the amount of the air delivered into the regions by controlling operation of the airflow control portion in accordance with the pressure ratio of the regions.

7 Claims, 20 Drawing Sheets

(51) Int. Cl.
*G06F 3/041* (2006.01)
*G06F 3/044* (2006.01)

(52) U.S. Cl.
CPC ............ *G06F 3/041* (2013.01); *G06F 3/0414* (2013.01); *G06F 3/0447* (2019.05); *G06F 3/0487* (2013.01)

(58) Field of Classification Search
CPC .... B62D 33/0612; F28F 9/0275; F28F 27/02; F28F 2210/02; F24D 2220/046
USPC ................................................ 165/204, 205
See application file for complete search history.

(56) References Cited

U.S. PATENT DOCUMENTS

| | | | |
|---|---|---|---|
| 6,928,829 B2 | 8/2005 | Kamiya | |
| 7,201,441 B2 | 4/2007 | Stoewe | |
| 7,467,823 B2 | 12/2008 | Hartwich | |
| 7,877,827 B2 * | 2/2011 | Marquette | F24H 9/2071 5/423 |
| 8,181,290 B2 | 5/2012 | Brykalski | |
| 8,555,440 B2 | 10/2013 | Lewis | |
| 9,131,781 B2 | 9/2015 | Zaiss | |
| 2009/0312823 A1 | 12/2009 | Patience | |
| 2011/0258778 A1 | 10/2011 | Brykalski | |
| 2011/0296621 A1 | 12/2011 | McKenna | |
| 2013/0031722 A1 | 2/2013 | Wong | |
| 2013/0137354 A1 | 5/2013 | Tsuzaki | |
| 2013/0263378 A1 | 10/2013 | O'Keefe | |
| 2013/0299128 A1 | 11/2013 | Bergamini | |
| 2014/0007346 A1 | 1/2014 | Lachenbruch | |
| 2014/0047645 A1 | 2/2014 | Choi | |
| 2015/0007393 A1 | 1/2015 | Palashewski | |
| 2015/0247656 A1 | 9/2015 | Parish | |
| 2015/0359351 A1 | 12/2015 | Wilder | |
| 2016/0066701 A1 | 3/2016 | Diller | |
| 2016/0272038 A1 | 9/2016 | Tanaka | |
| 2016/0345571 A1 | 12/2016 | van Doornewaard | |

FOREIGN PATENT DOCUMENTS

| | | |
|---|---|---|
| JP | 2004-338598 A | 12/2004 |
| JP | 2006-131106 A | 5/2006 |
| JP | 2009-236353 A | 10/2009 |
| KR | 10-2008-0066428 A | 7/2008 |
| WO | WO 2009/036077 A1 | 3/2009 |
| WO | WO 2009/060786 A1 | 5/2009 |

* cited by examiner

VENTILATION BED FOR VEHICLE AND METHOD FOR CONTROLLING THE SAME

CROSS-REFERENCE TO RELATED APPLICATION

The present application is a Divisional of U.S. patent application Ser. No. 14/839,313, filed Aug. 28, 2015, which claims priority to Korean Patent Application No. 10-2015-0028523 filed Feb. 27, 2015, the entire contents of which applications are incorporated herein for all purposes by this reference these references.

BACKGROUND OF THE INVENTION

Field of the Invention

The present invention relates to a ventilation bed for a vehicle and a method for controlling the same. More particularly, the present invention relates to the ventilation bed, and a control method thereof to assist comfortable rest or sleep for a driver by supplying cooled or heated air from an air conditioning system.

Description of Related Art

Generally, large trucks are used for long distance freight hauling, thus a bedroom is provided as a separate rest area to reduce driver's fatigue. A bed for the truck is installed inside of the bedroom, and the driver may rest or sleep thereon.

In the long distance freight hauling field, rest and sleep have a decisive effect on safe driving of the driver. Therefore, a comfortable environment of the bedroom is being studied in order to improve quality of the rest and sleep.

According to the prior art, when the driver rests and sleeps on the bed, the driver turns an air conditioner or heater on in a vehicle stop state for cooling or heating the air in a cabin so as to appropriately adjust an indoor temperature.

However, this method of the air condition system cools or heats all air in the cabin, and thereby other spaces in addition to the bedroom where the driver rests are also cooled or heated. Therefore, considerable energy loss is generated, and heating and cooling efficiency become worse.

Meanwhile, when the driver sleeps, the driver draws a shade curtain to block light from outside, and the shade curtain partitions the cabin. Accordingly, the air cooled by the air conditioner or heated by the heater is stopped by the shade curtain, thus effective air circulation becomes difficult.

Consequently, the driver using the bed for a truck according to the prior art should open the shade curtain for a period of time to adjust the temperature of the bedroom, and thereafter draw the shade curtain again.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a ventilation bed for a vehicle and a method for controlling the same having advantages of supplying appropriate cooling or heating air to a driver depending on a lying position of the driver.

According to various aspects of the present invention, a ventilation bed for a vehicle may include an air conditioning system configured to supply air at a required temperature, a pad divided into a plurality of regions, and an airflow control apparatus configured to deliver the air supplied from the air conditioning system into the pad by controlling an amount and direction of the air, in which the air may be selectively supplied into at least a region of the pad depending on operation of the airflow control apparatus.

The ventilation bed may further include a switch configured to select at least a region among the plurality of the regions of the pad, and a control portion configured to control operation of the airflow control apparatus by the switch.

At least one ventilation hole configured to discharge the air which is supplied from the airflow control apparatus may be formed in the plurality of regions.

The ventilation hole may be disposed adjacent to an edge of the pad.

The ventilation hole may be configured to face to a center of the pad.

The air conditioning system may be configured to operate in a vehicle stop state.

The ventilation bed may further include a mesh which is formed in a net shape and is made of a fabric, in which the mesh may be disposed on an upper portion of the pad.

The airflow control apparatus may include an upper cover, a lower cover coupled to the upper cover and configured to discharge the air supplied from the air conditioning system by a plurality of outlets formed at a lateral side thereof, a ventilation duct in fluid-communication with the plurality of outlets and configured to direct air supplied from the outlets to the plurality of regions of the pad, an airflow control portion having a plurality of vents formed at a lateral side thereof and disposed between the upper cover and the lower cover to be rotatable so as to regulate a total amount of the air which is discharged therefrom depending on an area overlapped between the vents and the outlets while the airflow control portion is rotated, and a motor that rotates the airflow control portion by a control signal of the control portion.

Operation modes of the airflow control portion may include a basic mode, and a plurality of concentration modes, in which at least one mode is selected by the switch, and when the basic mode is selected by the switch, the control portion may be configured to control such that the air at a predetermined temperature is equally distributed into each of the regions of the pad.

When one of the concentration modes is selected by the switch, the control portion may be configured to control such that more air at predetermined temperature is supplied into a region of the pad.

The ventilation bed may further include a pressure detecting sensor configured to measure a pressure on the pad, and the operation modes of the airflow control portion may further include an automatic mode, in which when the automatic mode is selected by the switch, the control portion is configured to control such that more air is supplied into the region of the pad where the pressure is relatively high as compared with the remaining regions based on information transmitted from the pressure detecting sensor.

According to various aspects of the present invention, a ventilation bed controlling method; the ventilation bed including an airflow control apparatus configured to selectively deliver a required amount of air supplied from an air conditioning system into a region of a pad divided into a plurality of regions, a switch configured to select at least a portion among the plurality of the regions of the pad, an airflow control portion disposed inside of the airflow control apparatus to be rotatable and that regulates a total amount of the air discharged therefrom; may include detecting, by a pressure detecting sensor, whether a pressure is applied on the region of the pad or not, when an automatic mode is selected by a switch, determining a relative pressure ratio value of the plurality of regions of the pad, by a control portion, when the pressure is applied on the pad, and regulating the amount of the air delivered into the plurality of regions by controlling operation of the airflow control portion in accordance with the pressure ratio of the plurality of regions.

The pad may include an A region pad portion positioned at a right rear side of the pad, a B region pad portion positioned at a right front side of the pad, a C region pad portion positioned at a center front side of the pad, a D region pad portion positioned at a center front side of the pad, an E region pad portion positioned at a left rear side of the pad, and an F region pad portion positioned at a left front side of the pad, and the method may further include a basic mode, in which the basic mode may be operated, by the control portion, when an absolute value of a difference value of the pressure ratio between the C region pad portion and the D region pad portion is lower than a first predetermined value, when the absolute value of the differential value of the pressure ratio between the A region pad portion and the B region pad portion is lower than a second predetermined value, or when the absolute value of the differential value of the pressure ratio between the E region pad portion and the F region pad portion is lower than a third predetermined value, and in the basic mode, the air at the predetermined temperature may be respectively distributed into the A, C, and E region pad portions and the B, D, and F region pad portions equally.

The ventilation bed controlling method may further include a first mode, in which the first mode may be operated by the control portion when a value acquired by subtracting the pressure ratio of the D region pad portion from that of the C region pad portion is greater than the first predetermined value, and when the value acquired by subtracting the pressure ratio of the F region pad portion from that of the E region pad portion is greater than the third predetermined value, and in the first mode, the air supplied into the A, C, and E region pad portions is relatively more than the air supplied into the B, D, and F region pad portions.

The ventilation bed controlling method may further include a second mode, in which the second mode may be operated by the control portion when a value acquired by subtracting the pressure ratio of the D region pad portion from that of the C region pad portion is greater than the first predetermined value, when a value acquired by subtracting the pressure ratio of the E region pad portion from that of the F region pad portion is greater than the third predetermined value, and when a value acquired by subtracting the pressure ratio of the A region pad portion from that of the B region pad portion is greater than the second predetermined value, and in the second mode, the air supplied into the B, C, and F region pad portions is relatively more than the air supplied into the A, D, and E region pad portions.

The ventilation bed controlling method may further include a third mode, in which the third mode may be operated by the control portion when a value acquired by subtracting the pressure ratio of the D region pad portion from that of the C region pad portion is greater than the first predetermined value, when a value acquired by subtracting the pressure ratio of the E region pad portion from that of the F region pad portion is greater than the third predetermined value, and when a value acquired by subtracting the pressure ratio of the B region pad portion from that of the A region pad portion is greater than the second predetermined value, and in the third mode, the air supplied into the A, C, and F region pad portions may be relatively more than the air supplied into the B, D, and E region pad portions.

The ventilation bed controlling method may further include a fourth mode, in which the fourth mode may be operated by the control portion, when a value acquired by subtracting the pressure ratio of the C region pad portion from that of the D region pad portion is greater than the first predetermined value, when a value acquired by subtracting the pressure ratio of the A region pad portion from that of the B region pad portion is greater than the second predetermined value, and when a value acquired by subtracting the pressure ratio of the E region pad portion from that of the F region pad portion is greater than the third predetermined value, and in the fourth mode, the air supplied into the B, D, and F region pad portions may be relatively more than the air supplied into the A, C, and E region pad portions.

The ventilation bed controlling method may further include a fifth mode, in which the fifth mode may be operated by the control portion when a value acquired by subtracting a pressure ratio of the C region pad portion from that of the D region pad portion is greater than the first predetermined value, when a value acquired by subtracting a pressure ratio of the F region pad portion from that of the E region pad portion is greater than the third predetermined value, and when a value acquired by subtracting a pressure ratio of the B region pad portion from that of the A region pad portion is greater than the second predetermined value, and in the fifth mode, the air supplied into the A, D, and E region pad portions may be relatively more than the air supplied into the B, C, and F region pad portions.

The ventilation bed controlling method may further include a sixth mode, in which the sixth mode may be operated by the control portion when a value acquired by subtracting the pressure ratio of the C region pad portion from that of the D region pad portion is greater than the first predetermined value, when a value acquired by subtracting a pressure ratio of the F region pad portion from that of the E region pad portion is greater than the third predetermined value, and when a value acquired by subtracting a pressure ratio of the A region pad portion from that of the B region pad portion is greater than the second predetermined value, and in the sixth mode, the air supplied into the B, D, and E region pad portions may be relatively more than the air supplied into the A, C, and F region pad portions.

As described above, the ventilation bed according to various embodiments of the present invention may be operated by the driver in order to cool or heat a local portion thereof without cooling or heating all air in the cabin, thereby the energy loss may be decreased. In addition, an appropriate temperature environment for rest or sleep may be provided by reason of supplying directly cooled or heated air to the driver quickly. Moreover, despite drawing a shade curtain, the driver may receive the cooled or heated air. Thus, convenience thereof may be improved.

Meanwhile, according to various embodiments of the present invention, the driver may preset each position of the air supplied from the ventilation bed according to his preference. Therefore, air that satisfies the driver's request may be supplied therein. Further, the driver may rest or sleep on the ventilation bed conveniently in the pleasant environment because the cooled or heated air may be automatically supplied to the driver in accordance with the driver's position without additionally operating the ventilation bed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
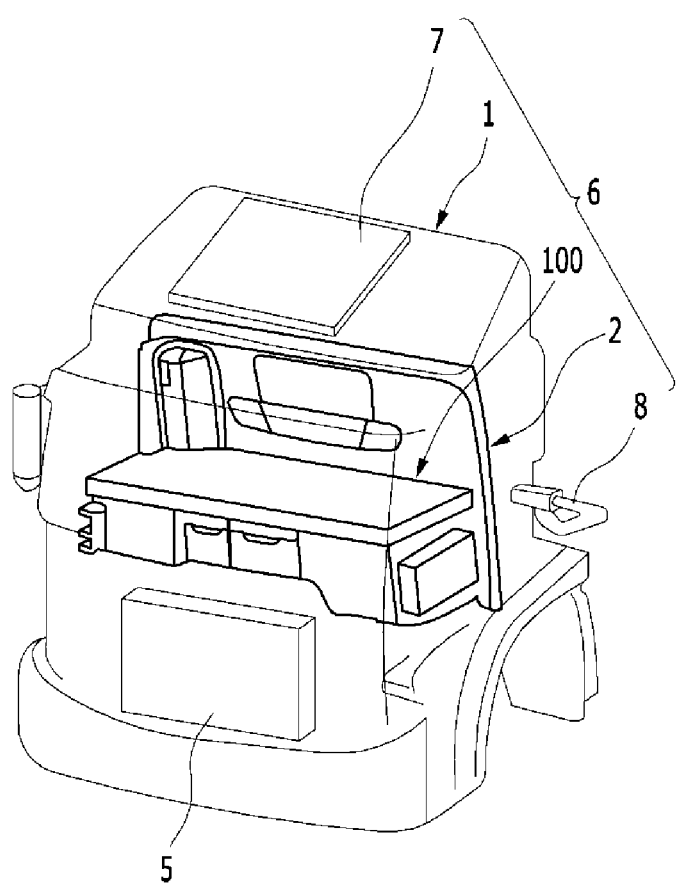
FIG. 1 is a projection view of an exemplary ventilation bed according to the present invention.
Figure 2:
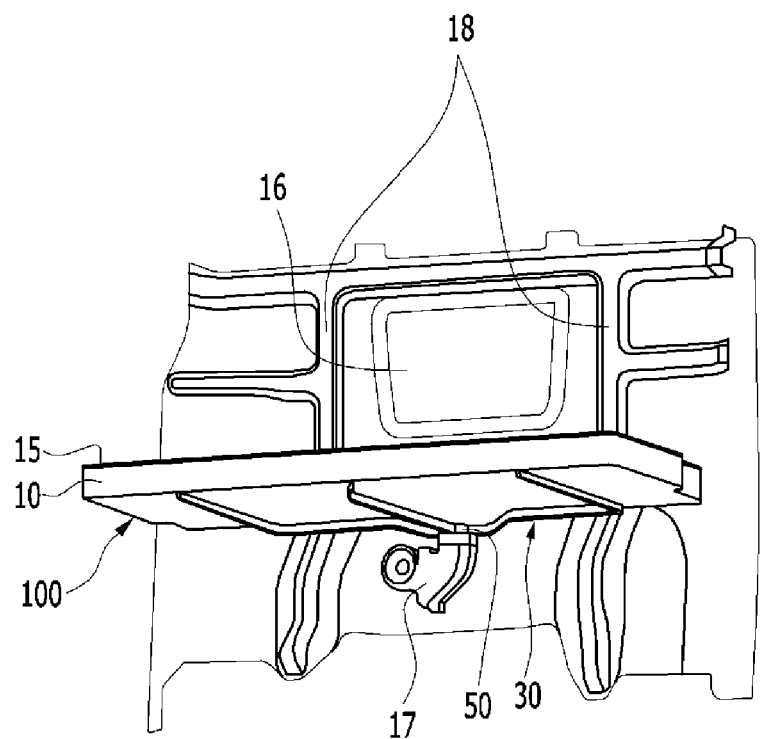
FIG. 2 is a perspective view of the exemplary ventilation bed according to the present invention.
Figure 3:
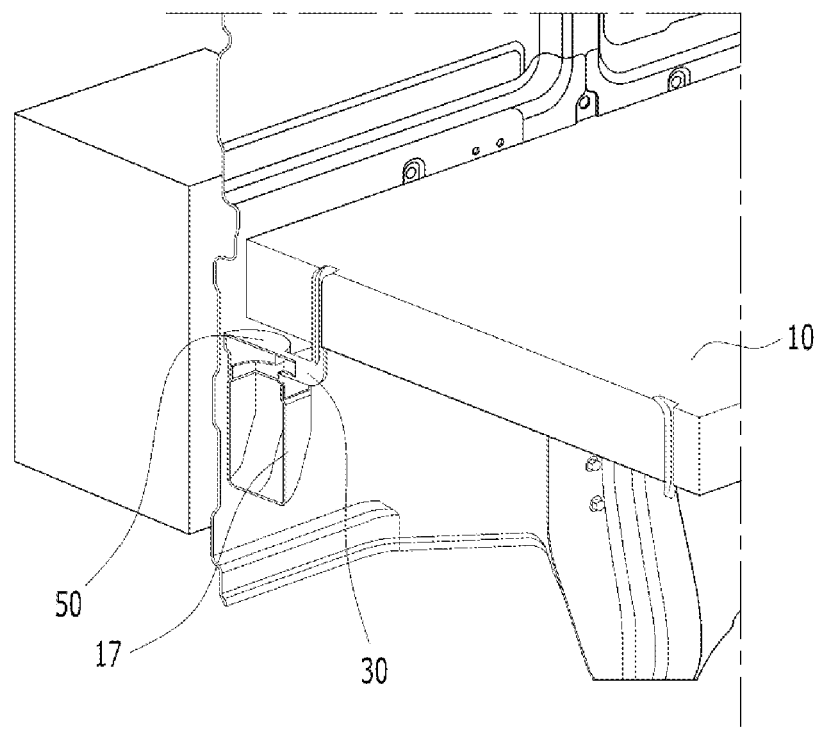
FIG. 3 is a cross-sectional perspective view of the exemplary ventilation bed according to the present invention.
Figure 4:
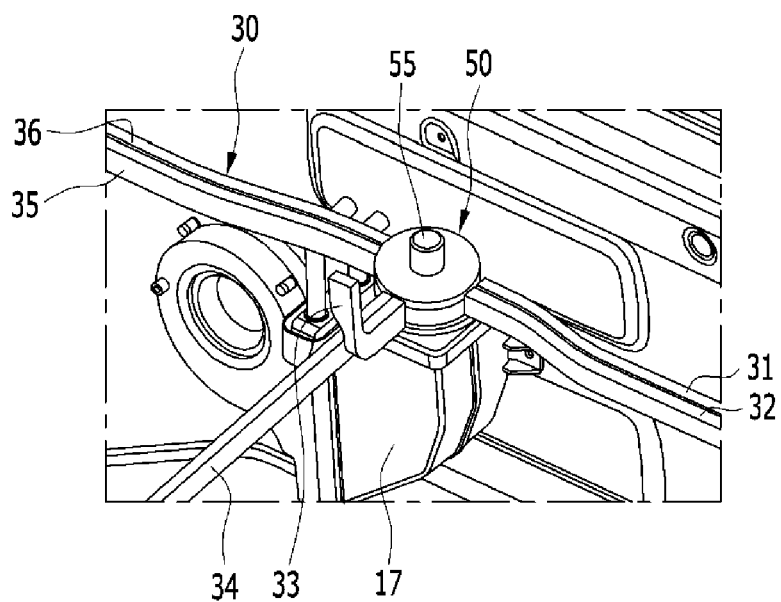
FIG. 4 is a schematic diagram of an airflow control apparatus applied to the exemplary ventilation bed according to the present invention.
Figure 5:
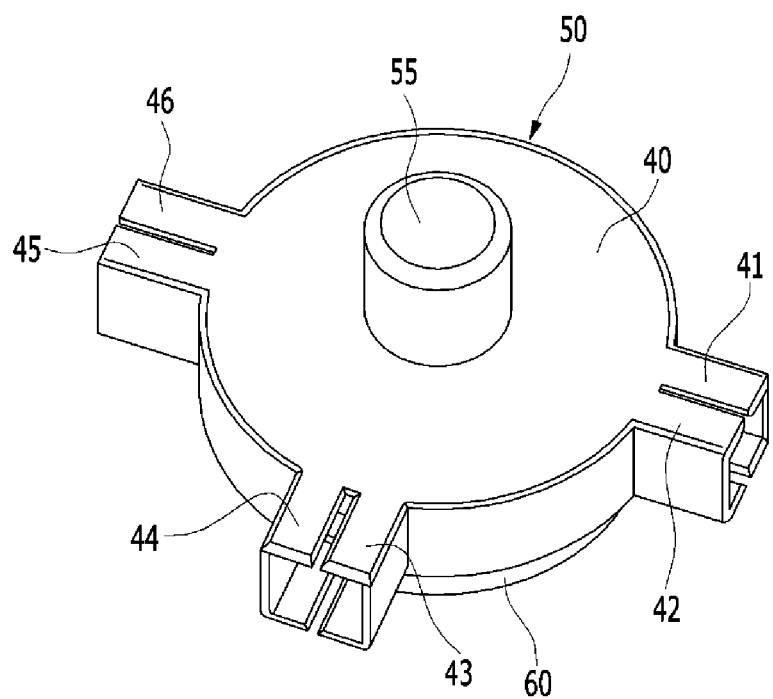
FIG. 5 is a perspective view of the airflow control apparatus applied to the exemplary ventilation bed according to the present invention.
Figure 6:
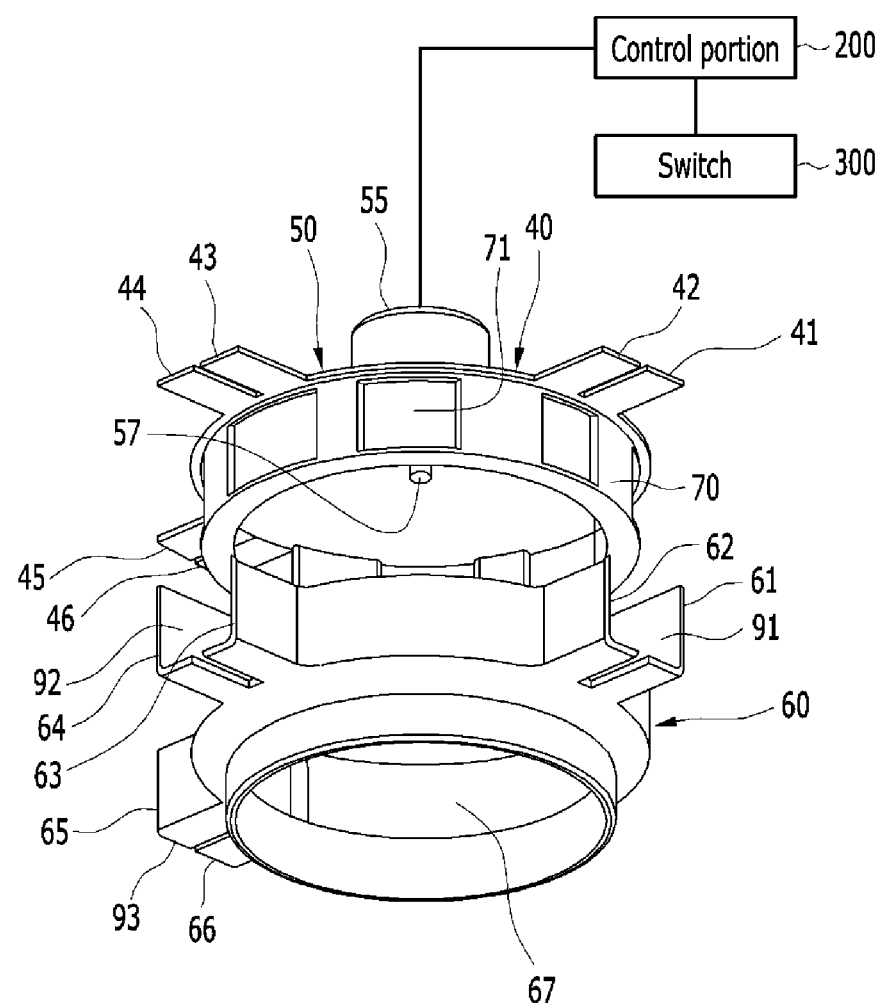
FIG. 6 is an exploded perspective view of the airflow control apparatus applied to the exemplary ventilation bed according to the present invention.
Figure 7:
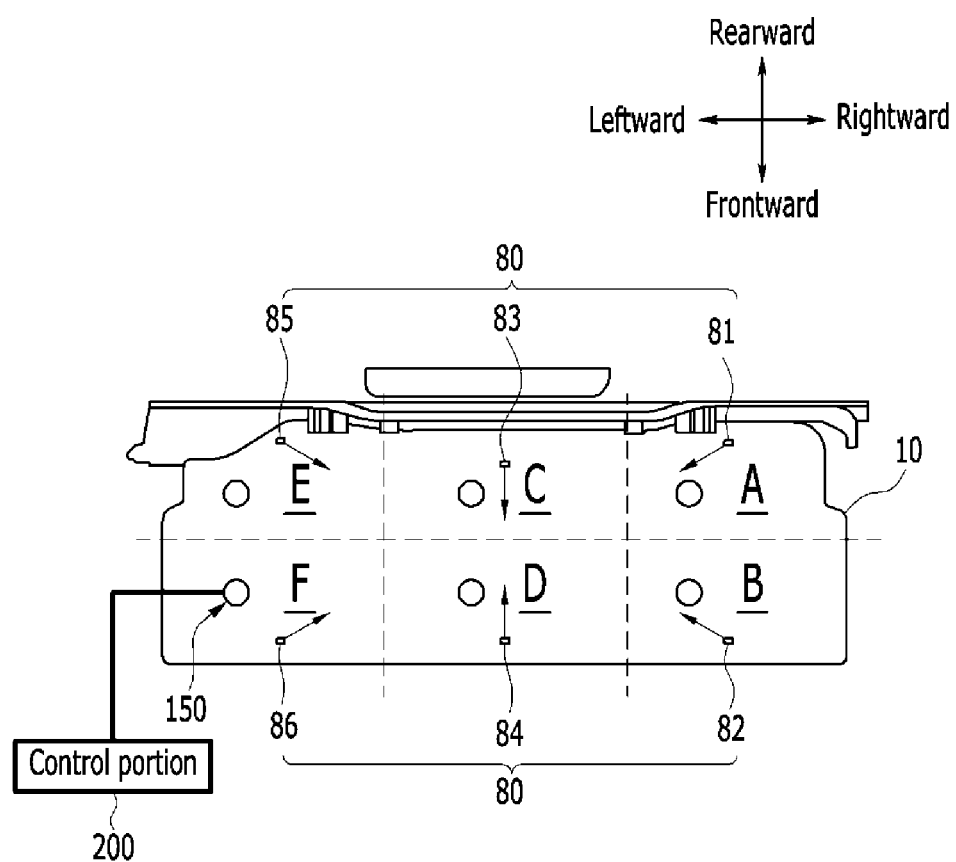
FIG. 7 is a top plan view of the exemplary ventilation bed according to the present invention.

FIG. 1 is a projection view of a ventilation bed according to various embodiments of the present invention, FIG. 2 is a perspective view of the ventilation bed according to various embodiments of the present invention, FIG. 3 is a cross-regional perspective view of the ventilation bed according to various embodiments of the present invention, FIG. 4 is a schematic diagram of an airflow control apparatus applied to the ventilation bed according to various embodiments of the present invention, FIG. 5 is a perspective view of the airflow control apparatus applied to the ventilation bed according to various embodiments of the present invention, FIG. 6 is an exploded perspective view of the airflow control apparatus applied to the ventilation bed according to various embodiments of the present invention, and FIG. 7 is a top plan view of the ventilation bed according to various embodiments of the present invention.

As shown in FIG. 1 to FIG. 2, a truck cab 1 is a driving space for a driver, and a main air conditioning system 5 and an auxiliary air conditioning system 6 may be provided therein so as to regulate a temperature inside of the truck cab 1. The main air conditioning system 5 is operated when an engine is started, and is configured to cool or heat the inside of the truck cab 1. The auxiliary air conditioning system 6 may include an auxiliary air conditioner 7 and an auxiliary heater 8, and it may cool or heat the inside of the truck cab 1 when the engine is stopped (in a vehicle stop state) so as to regulate the temperature.

In the truck cab 1, a bedroom 2 is provided such that the driver can rest or sleep. The bedroom 2 includes a back panel 16 forming a back surface of the bedroom 2, a pair of height direction extension members 18 which are mounted at the front surface of the back panel 16 and extended from upward to downward, and a ventilation bed 100 which in formed in a generally square shape and mounted to the pair of height direction extension members 18.

The ventilation bed 100 will be described with reference to FIG. 2 to FIG. 7 in detail.

As shown in FIG. 2 to FIG. 3, the ventilation bed 100 according to various embodiments of the present invention includes a pad 10, a blower 17, an airflow control apparatus 50, and a control portion 200 (see FIG. 6).

The pad 10 is formed in a shape of a flat plate such that the driver can rest or sleep thereon. A mesh 15 having good air permeability may be provided on an upper side of the pad 10. Thus, the mesh 15 may naturally mix air discharged from the pad 10 and supply the air into the driver who rests on the pad 10.

As shown in FIG. 7, the pad 10 may be divided into a plurality of regions. For example, as described in a FIG. 7, the pad 10 may be divided into A, B, C, D, E, and F region pad portions A, B, C, D, E, F, and F. The A region pad portion A is positioned at a right side of the pad 10 in a length direction and at a rear side in a width direction of the pad 10. The B region is positioned at the right front side of the pad, the C region is positioned at center front side of the pad, the D region is positioned at center front side of the pad, the E region is positioned at left rear side of the pad, and the F region is positioned at left front side of the pad.

Each region pad portion A, B, C, D, E, and F has a pressure detecting sensor 150. When the pressure detecting sensor 150 detects a pressure from each region pad portion A, B, C, D, E, and F, the signal of the detected pressure is transmitted to the control portion 200.

In addition, each pad portion A, B, C, D, E, and F has a plurality of ventilation holes so as to supply the air to the driver. In other words, the pad 10 is provided with a first ventilation hole 81 formed at the A pad portion, a second ventilation hole 82 formed at the B pad portion, a third ventilation hole 83 formed at the C pad portion, a fourth ventilation hole 84 formed at the D pad portion, a fifth ventilation hole 85 formed at the E pad portion, and a sixth ventilation hole 86 formed at the F pad portion.

For example, the first, third, fifth ventilation holes 81, 83, and 85 are disposed close to the rear end portion of the pad 10, and the second, fourth, sixth ventilation holes 82, 84, and 86 are disposed close to the front end portion of the pad 10. Each ventilation hole 81, 82, 83, 84, 85, and 86 disposed at an edge of the pad 10 may prevent the air from being directly injected to a body of the driver, and suppresses a feeling of discomfort when the driver lies down. In addition, as described by an arrow in FIG. 7, each ventilation hole 81, 82, 83, 84, 85, and 86 may face a center of the pad in the length direction and width direction. Thus, the discharged air from the ventilation hole 80 is effectively supplied to the driver.

The blower 17 is configured to supply the cooled or heated air transferred via the main air conditioning system 5 or the auxiliary air conditioning system 6 into the airflow control apparatus 50 by pressurizing it.

The airflow control apparatus 50, as shown in FIG. 4 to FIG. 6, is configured to transfer the air supplied from the blower 17 to each region pad portion A, B, C, D, E, and F by controlling a flow of the air. The airflow control apparatus 50 includes an upper cover 40, a lower cover 60, a ventilation duct 30, a motor 55, and the airflow control portion 70.

The upper cover 40 is configured to cover an upper side of the airflow control apparatus 50. The upper cover 40 includes a first upper protrusion wing 41 and a second upper protrusion wing 42 which are extended in a direction of the A region pad portion A, a third upper protrusion wing 43 and a fourth upper protrusion wing 44 which are extended to a direction of the D region pad portion D, and a fifth upper protrusion wing 45 and a sixth upper protrusion wing 46 which are extended in a direction of the E region pad portion E.

The lower cover 60 having a hole in the center is formed in a cylindrical shape, and may be mounted to the underside of the upper cover 40. An inflow hole 67 is formed on the underside of the lower cover 60, and the air from the blower 17 may flow in the inflow hole 67. The lower cover 60 includes a first lower protrusion cover 61 and a second upper protrusion cover 62 which are extended in a direction of the A region pad portion A, a third lower protrusion cover 63 and a fourth lower protrusion cover 64 which are extended to a direction of the D region pad portion D, and a fifth lower protrusion cover 65 and a sixth lower protrusion cover 66 which are extended in a direction of the E region pad portion E. The first, second, third, fourth, fifth, and sixth lower protrusion covers 61, 62, 63, 64, 65, and 66 may be combined to the first, second, third, fourth, fifth, and sixth upper protrusion wings respectively.

The upper protrusion wings 41, 42, 43, 44, 45, and 46 and the lower protrusion covers 61, 62, 63, 64, 65, and 66 may be coupled to each other and inserted into the ventilation duct 30.

In addition, the upper protrusion wings 41, 42, 43, 44, 45, and 46 and the lower protrusion covers 61, 62, 63, 64, 65, and 66 may form a plurality of outlets 91, 92, and 93 such that the air is discharged to the ventilation duct 30.

The ventilation duct 30 directs the air supplied from the blower 17 into the pad 10. The ventilation duct 30 includes a first ventilation duct 31, a second ventilation duct 32, a third ventilation duct 33, a fourth ventilation duct 34, a fifth ventilation duct 35, and a sixth ventilation duct 36. Each end of the ventilation ducts 31, 32, 33, 34, 35, and 36 defining a closed cross-section may be coupled to a peripheral portion of each upper protrusion wing 41, 42, 43, 44, 45, and 46 and each lower protrusion cover 61, 62, 63, 64, 65, and 66. The other end of each ventilation duct 31, 32, 33, 34, 35, and 36 is extended to each region pad portion A, B, C, D, E, and F.

Thus, the air supplied from the ventilation duct 30 is directed to the driver through the ventilation hole 80 formed on each region pad portion A, B, C, D, E, and F.

The motor 55 may be mounted on the upper surface of the upper cover 40, it is controlled by the control portion 200. An inter-locking member 57 may be mounted on the under surface of the motor 55 while passing through a portion of the upper cover 40. When the motor 55 is operated according to the control signal of the control portion 200, the inter-locking member 57 connected to the motor 55 is rotated together and the airflow control portion 70 connected to the inter-locking member 57 is also rotated.

The airflow control portion 70, as shown in FIG. 6, is generally in a cylindrical shape and having opened lower side surfaces, and is provided between the upper cover 50 and the lower cover 60 and may be mounted to be rotatable. In other words, the airflow control portion 70 is coupled to the inter-locking member 57 and rotates when receiving a torque from the inter-locking member 57 inside of the upper cover 50 and the lower cover 60.

A plurality of vents 71 are formed on the side of the airflow control portion 70, and each vent may be formed in various sizes. According to various embodiments of the present invention, a first vent 71*a*, a second vent 71*b*, a third vent 71*c*, a fourth vent 71*d*, a fifth vent 71*e*, a sixth vent 71*f*, a seventh vent 71*g*, and an eight vent 71*h* may be formed on the side of the airflow control portion 70, but a number or a shape of the vent is not limited to the above-described.

While the airflow control portion is rotated, a position of the vent 71 is moved. When the positions of each vent 71*a*, 71*b*, 71*c*, 71*d*, 71*e*, 71*f*, 71*g*, and 71*h* is overlapped with the each ventilation duct 31, 32, 33, 34, 35, and 36, the air flowed in the inflow hole 67 is directed into the ventilation duct 30 via the vent 71.

Figure 8:
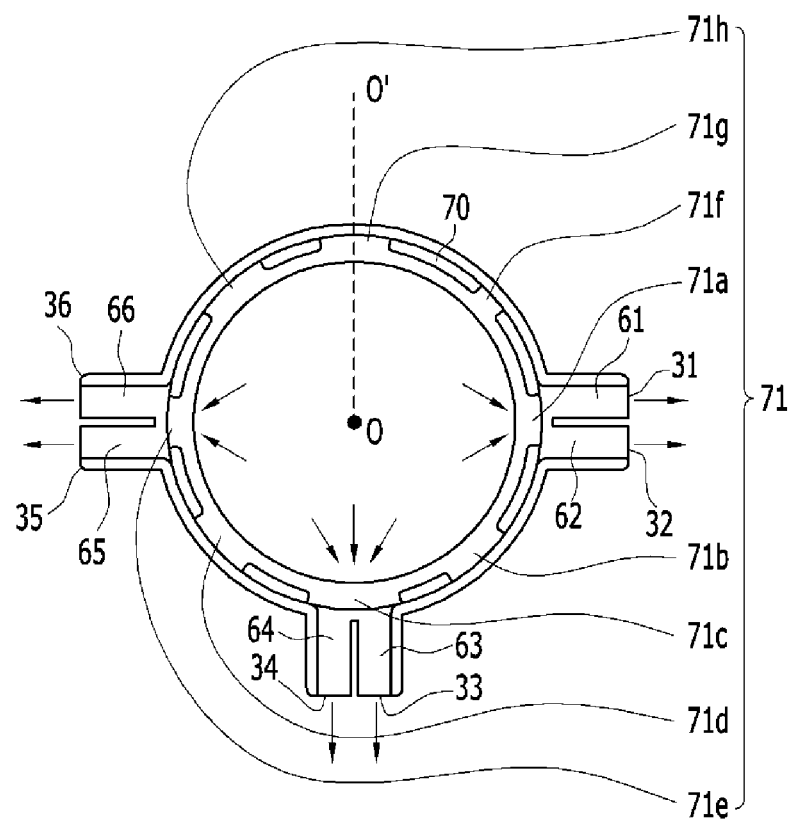
FIG. 8 is a first operation state view of the airflow control apparatus applied to the exemplary ventilation bed according to the present invention.
Figure 9:
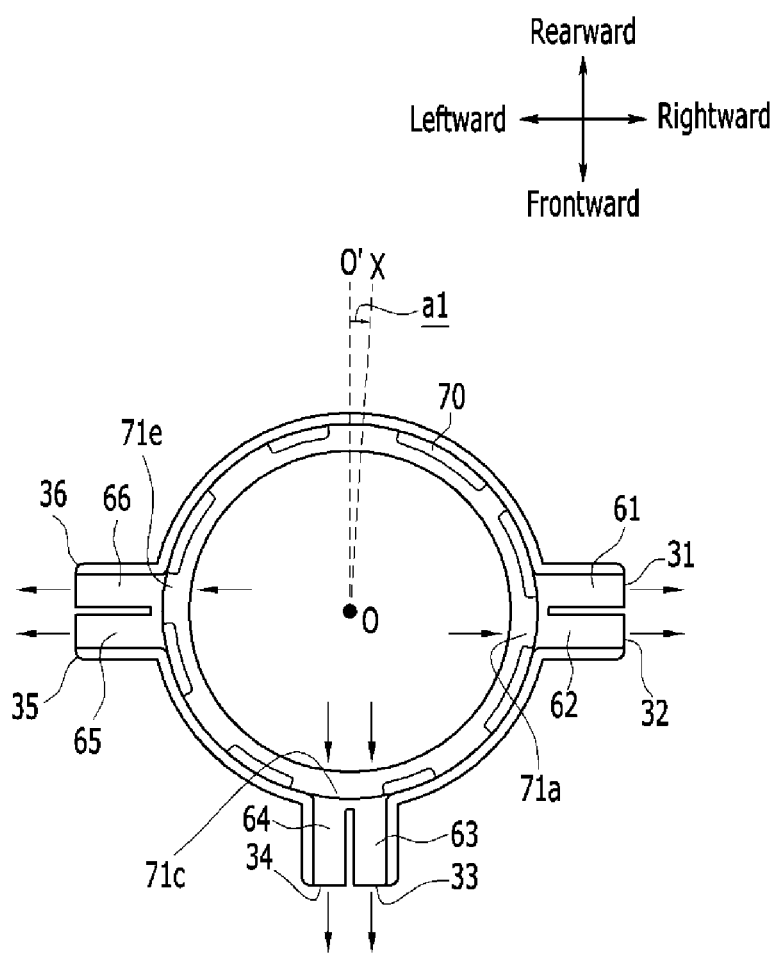
FIG. 9 is a second operation state view of the airflow control apparatus applied to the exemplary ventilation bed according to the present invention.
Figure 10:
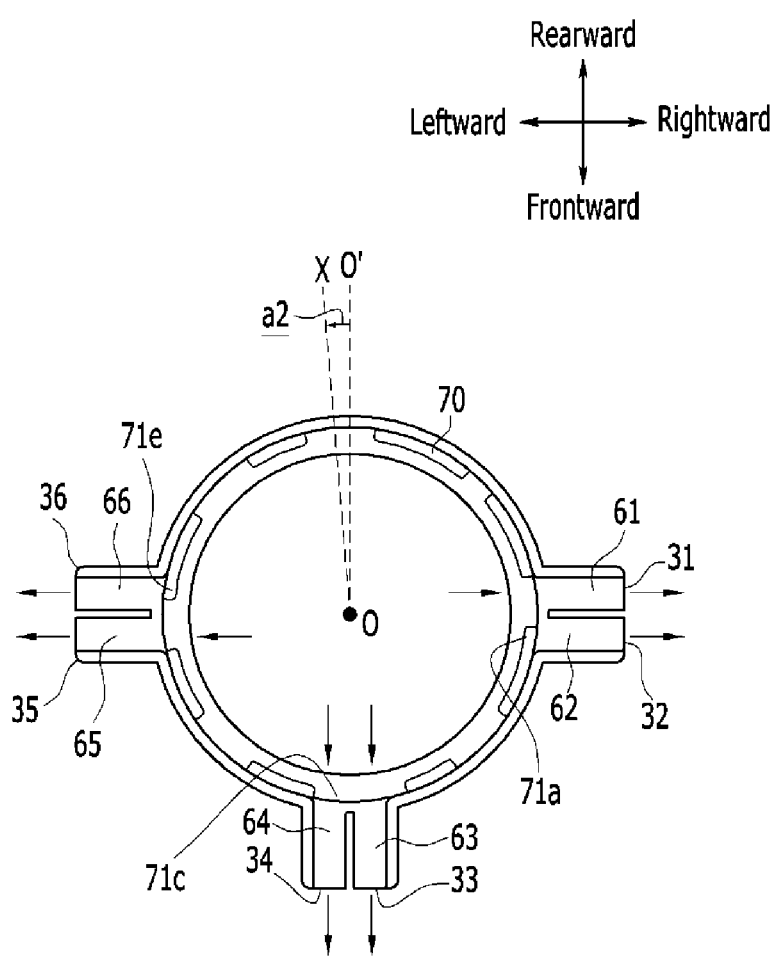
FIG. 10 is a third operation state view of the airflow control apparatus applied to the exemplary ventilation bed according to the present invention.
Figure 11:
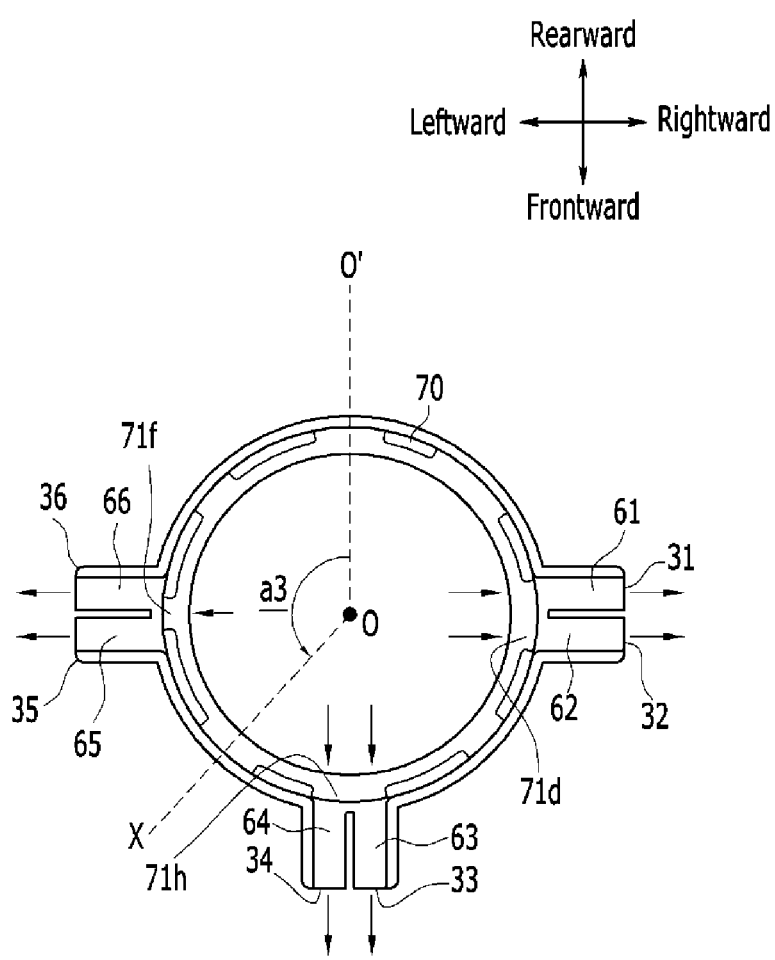
FIG. 11 is a fourth operation state view of the airflow control apparatus applied to the exemplary ventilation bed according to the present invention.
Figure 12:
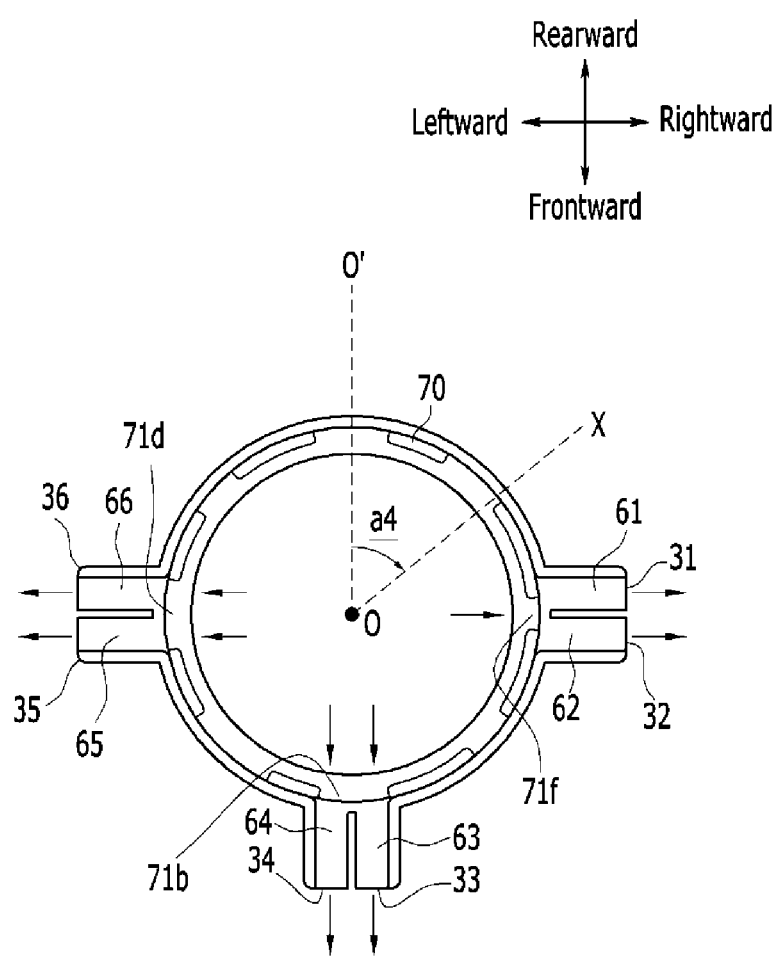
FIG. 12 is a fifth operation state view of the airflow control apparatus applied to the exemplary ventilation bed according to the present invention.

FIG. 8 is a first operation state view of the airflow control apparatus applied to the ventilation bed according to various embodiments of the present invention, FIG. 9 is a second operation state view of the airflow control apparatus applied to the ventilation bed according to various embodiments of the present invention, FIG. 10 is a third operation state view of the airflow control apparatus applied to the ventilation bed according to various embodiments of the present invention, FIG. 11 is a fourth operation state view of the airflow control apparatus applied to the ventilation bed according to various embodiments of the present invention, and FIG. 12 is a fifth operation state view of the airflow control apparatus applied to the ventilation bed according to various embodiments of the present invention.

Operation of the airflow control apparatus 50 will be described with reference from FIG. 8 to FIG. 12 in detail.

As shown in FIG. 8, in a state in which the airflow control portion 70 is not rotated (hereinafter referred to as a "basic mode"), the first vent 71a is positioned between the first ventilation duct 31 and the second ventilation duct 32. In addition, the third vent 71c is positioned between the third ventilation duct 33 and the fourth ventilation duct 34, and the fifth vent 71e is positioned between the fifth ventilation duct 35 and the sixth ventilation duct 36.

A width of the first vent 71a may be larger than a gap between a front surface of the first vent 31 and a rear surface of the second ventilation duct 32, and a width of the third vent 71c may be larger than a gap between a right surface of the third ventilation duct 33 and a left surface of the fourth ventilation duct 34. Thus, the air flowing into the airflow control apparatus 50 is respectively discharged into the first, the second, the fifth, and the sixth ventilation ducts 31, 32, 35, and 36, and the air is fully discharged into the third, and the fourth ventilation ducts 33 and 34. Accordingly, less air is supplied into the first, the second, the fifth, and the sixth vents than the third and the fourth ventilation ducts 33 and 34.

As described above, in the basic mode, an amount of the air supplied into the first, the second, the fifth, and the sixth ventilation ducts 31, 32, 35, and 36 is less than the amount of air supplied into the third and the fourth ventilation ducts 33 and 34. Thus, the amount of air supplied into the A, B, E, and F region pad portions A, B, E, and F respectively connected to the first, second, fifth, and sixth ventilation ducts 31, 32, 35, and 36 is less than the amount of air supplied into the C and D pad portions C and D connected to the third and fourth ventilation ducts 33 and 34. Therefore, when the driver lies on the center of the pad 10 in the basic mode, less air is supplied into the A and B region pad portions A and B where a head is positioned and the E and F region pad portions E and F where legs are positioned than C and D region pad portions C and D where a body is positioned. This offers the driver a pleasant environment.

In addition, the first vent 71a blocks the first ventilation duct 31 and the second ventilation duct 32 at the same size, thereby the air supplied into the first ventilation duct 31 is equal in amount to that of the second ventilation duct. Therefore, the amount of air supplied into the first region pad portion A is equal to that of the second region pad portion B. Similarly, the air supplied into the C and E region pad portions is equal to that of the D and F region pad portions, respectively. Therefore, the cooled or heated air is supplied to the driver from the front side and rear side of the pad 10 equally.

Meanwhile, in the basic mode, an air ratio of all air supplied into the first, second, fifth, and sixth ventilation ducts 31, 32, 35, and 36 may be 15 percent, respectively, and an air ratio of all air supplied into the third and fourth ventilation ducts 33 and 34 may be twenty percent, respectively. However, this ratio is not limited thereto. The air ratio supplied into each ventilation duct 31, 32, 33, 34, 35, and 36 is generally proportional to the size of the vent 71, and the size of the vent 71 may be set by a person of ordinary skill in the art.

As shown in FIG. 9, in a state in which the airflow control portion 70 is rotated in a clockwise direction as a first predetermined angle a1 based on the basic mode (hereinafter, referred to as a "front concentration mode"), the air supplied into the first and the fifth ventilation ducts 31 and 35 is reduced, and the air is fully supplied into the second, third, fourth, and sixth ventilation ducts 32, 33, 34, and 36.

Thus, more air is supplied into B, C, D, and F region pad portions B, C, D, and F respectively connected to the second, third, fourth, and sixth ventilation ducts 32, 33, 34, and 36 than the other region pad portions A and E. Therefore, when the driver lies on the front side of the pad 10, operating the front concentration mode, the cooled or heated air is fully supplied to the driver from the pads B, D, and F positioned frontward.

As shown in FIG. 10, in a state in which the airflow control portion 70 is rotated in an anticlockwise direction as a second predetermined angle a2 based on the basic mode (hereinafter, referred to as a "rear concentration mode"), the air supplied into the second and sixth ventilation ducts 32 and 36 is reduced, and the air is fully supplied into the first, third, fourth, and fifth ventilation ducts 31, 33, 34, and 35. Thus, more air is supplied into A, C, D, and E region pad portions A, C, D, and E respectively connected to the first, third, fourth, and fifth ventilation ducts 31, 33, 34, and 35 than the other region pad portions B and F. Therefore, when the driver lies on the rear side of the pad 10, operating the rear concentration mode, the cooled or heated air is fully supplied to the driver from the pads A, C, and E positioned frontward.

As shown in FIG. 11, in a state in which the airflow control portion 70 is rotated in the anticlockwise direction as a third predetermined angle a3 based on the basic mode (hereinafter, referred to as a "right concentration mode"), the air supplied into the fifth and sixth ventilation ducts 35 and 36 is reduced, and the air is fully supplied into the first, second, third, and fourth ventilation ducts 31, 32, 33, and 34. Thus, more air is supplied into A, B, C, and D region pad portions A, B, C, and D respectively connected to the first, second, third, and fourth ventilation ducts 31, 32, 33, and 34 than the other region pad portions E and F. Therefore, when the driver lies down such the driver's head is positioned at the right side of the pad 10, operating the right concentration mode, the cooled or heated air is fully supplied to the driver's head portion intensively.

As shown in FIG. 12, in a state in which the airflow control portion 70 is rotated in the clockwise direction as a fourth predetermined angle a4 based on the basic mode (hereinafter, referred to as a "left concentration mode"), the air supplied into the first and second ventilation ducts 31 and 32 is reduced, and the air is fully supplied into the third, fourth, fifth, and sixth ventilation ducts 33, 34, 35, and 36. Thus, more air is supplied into C, D, E, and F region pad portions C, D, E, and F respectively connected to the third, fourth, fifth, and sixth ventilation ducts 33, 34, 35, and 36 than the other region pad portions A and B. Therefore, when the driver lies down such the driver's legs are positioned at the left side of the pad 10, operating the left concentration mode, the cooled or heated air is fully supplied to the driver's legs portion intensively.

As shown in FIG. 6, the control portion 200 may control a rotation of the motor 55 and the airflow control portion 70 connected to the motor 55. The control portion 200 may be a typical electronic control unit (ECU) which comprehensively controls the electronic components of a vehicle.

A switch 300 may be provided in the control portion 200 so as to be gradationally or selectively operated depending on each mode as described above. The ventilation bed's user may further set or change each mode by demand. In addition, the user may select a state in which the airflow control portion 70 is rotated automatically (hereinafter, "auto mode") such that the user doesn't select the each mode through the switch 300 directly. In the auto mode, the control portion 200 receives a pressure value measured from the pressure detecting sensor 150 and controls the ventilation bed automatically. The method for controlling the ventilation bed 100 will be described later in the specification.

Figure 13:
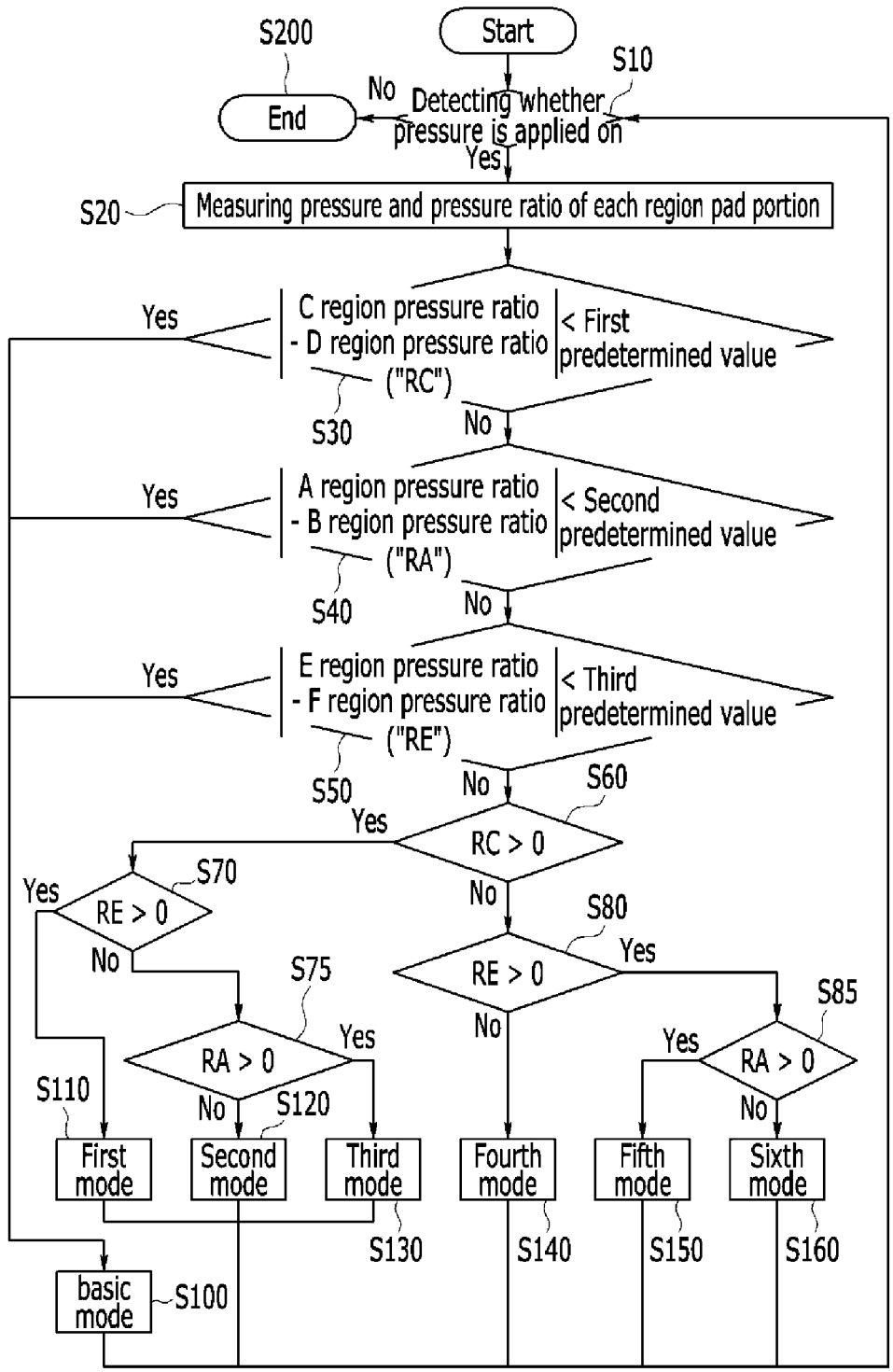
FIG. 13 is a flowchart illustrating a method for controlling the exemplary ventilation bed according to the present invention.

FIG. 13 is a flowchart illustrating a method for controlling the ventilation bed according to various embodiments of the present invention, and FIG. 14 to FIG. 20 respectively show top plan views of each mode in which the air is supplied to the ventilation bed.

As shown in FIG. 14 to FIG. 20, portions of the pad 10 where air is fully supplied are indicated by an oblique line.

As shown in FIG. 13, a method for controlling the ventilation bed 100 according to various embodiments of the present invention starts by determining whether there is pressure on the pad 100 by sensing from the pressure detecting sensor 150 (S10). The pressure detecting sensor 150 operates at predetermined times so as to prevent frequent mode change. Appropriately, it operates every 30 minutes.

In the S10 stage, if there is no pressure on the pad 10, then the control of the ventilation bed according to various embodiments of the present invention is finished (S200).

In the S10 stage, if there is pressure on the pad 10, the pressure detecting sensor 150 measures pressure of each of the region pad portions A, B, C, D, E, and F, and delivers information thereof to the control portion 200. The control portion 200 determines rotation angle of the airflow control portion 70 depending on relative pressure ratio of each of the region pad portions A, B, C, D, E, and F. The relative ratio means a proportional pressure value of each of the region pad portions A, B, C, D, E, and F when a total pressure value of the pad 10 is 100.

Figure 14:
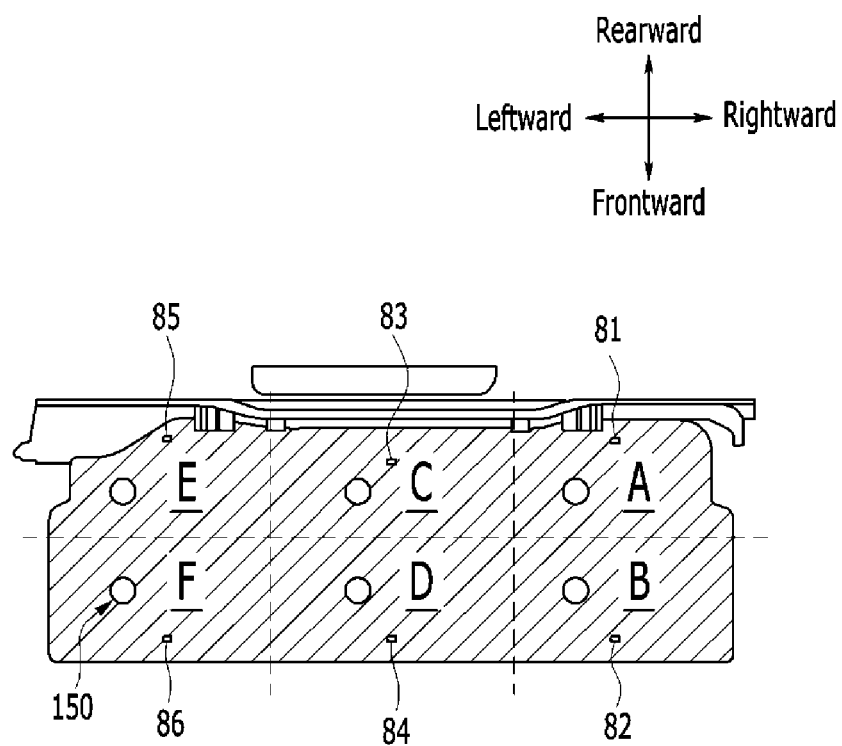
FIG. 14, FIG. 15, FIG. 16, FIG. 17, FIG. 18, FIG. 19, and FIG. 20 respectively show top plan views of each mode which the air is supplied to the exemplary ventilation bed.

If the relative pressure ratio is determined, the control portion 200 determines whether an absolute value of a differential value of the pressure ratio between the C region pad portion C and the D region pad portion D (hereinafter, referred to as "RC") is lower than a first predetermined value (S30). If the RC is lower than the first predetermined value, then the control portion 200 controls the airflow control portion 70 according to the basic mode (S100). In the basic mode, as shown in FIG. 14, air may be supplied to all pad portions A, B, C, D, E, and F. As described above, in the basic mode, when the driver lies on the pad 10, The C and D region pad portions C and D where the body is positioned receive more air than A, B, E, and F region pad portions A, B, E, and F where the head and legs are positioned. Moreover the air is supplied to the front side and the rear side of the pad 10 equally.

If the RC is greater than the first predetermined value, then the control portion 200 compares an absolute value of a differential value of the pressure ratio between the A region pad portion A and the D region pad portion D (hereinafter, referred to as "RA") with a second predetermined value (S40). In the S40 stage, if the RA is lower than the second predetermined value, then the control portion 200 controls the airflow control portion 70 according to the basic mode (S100).

If the RA is greater than the second predetermined value, then the control portion 200 compares an absolute value of a differential value of the pressure ratio between the E region pad portion E and the F region pad portion F (hereinafter, referred to as "RE") with a third predetermined value (S50). If the RE is lower than the third predetermined value, then the control portion 200 controls the airflow control portion 70 according to the basic mode (S100).

In the S30, S40, and S50 stages, when the driver lies on the pad 10, a pressure ratio between the front and rear side of the pad 10 is not much different, thereby the control portion 200 determines that the driver generally lies on the center of the pad 10, thus it operates so as to supply air into the entire pad 10 according to the basic mode.

If the RE is greater than the third predetermined value, then the control portion 200 determines whether the RC is positive (S60).

If the RC is positive, the control portion 200 determines whether the RE is positive (S70). Further, if the RE is positive, then the control portion 200 controls the airflow control portion 70 according to a first mode (S110).

Figure 15:
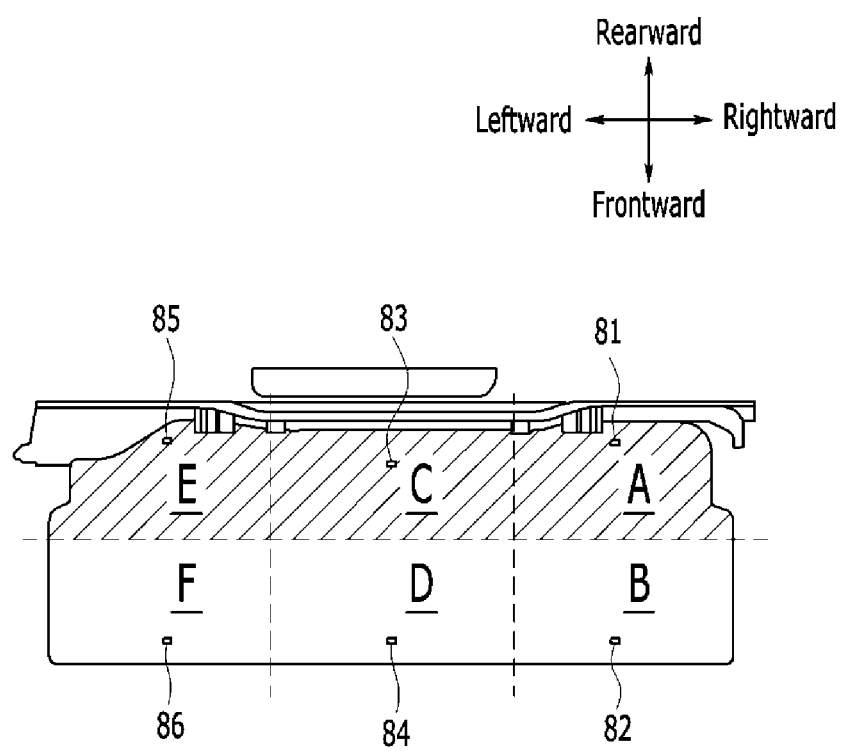

As shown in FIG. 15, in the first mode, the air supplied into the A, C, and E region pad portions A, C, and E is relatively more than the air supplied into the B, D, and F region pad portions B, D, and F by rotating the airflow control portion 70. In the first mode, the air supplied into the C region pad portion C may be more than that of the A and E region pad portions A and E, and the air may not be supplied into the B, D, and F pad portions B, D, and F. The first mode may provide an appropriate temperature environment when the driver lies on the rear of the pad 10.

In the S70 stage, if the RE is not positive, then the control portion 200 determines whether the RA is positive (S75). If the RA is not positive, then the control portion 200 controls the airflow control portion 70 according to a second mode (S120).

Figure 16:
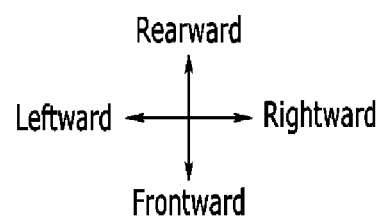
Figure 16:
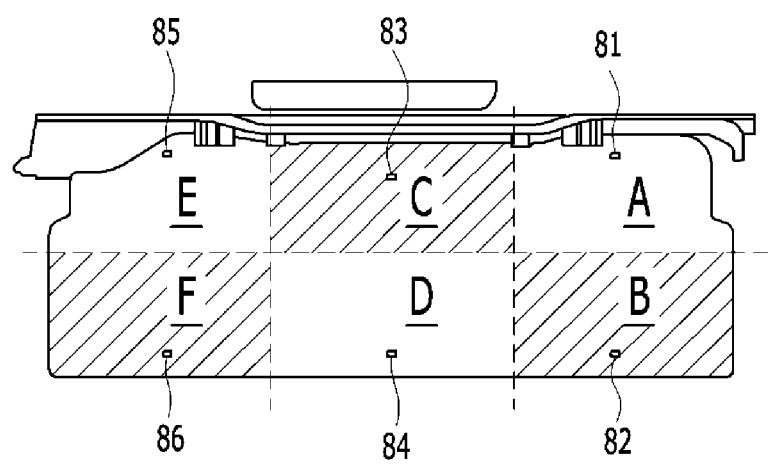

As shown in FIG. 16, in the second mode, the air supplied into the B, C, and F region pad portions B, C, and F is relatively more than the air supplied into the A, D, and E region pad portions A, D, and E by rotating the airflow control portion 70. In the second mode, the air supplied into C region pad portion C may be more than the B and F region pad portions B and F, and the air may not be supplied into the A, D, and E pad portions A, D, and E. Assuming that the driver lies on the pad 10 with his head on the right side, when the head and legs of the driver are positioned at the front side and the body is positioned at the rear side of the pad 10, the second mode may provide an appropriate temperature environment.

In the S75 stage, if the RA is positive, the control portion 200 controls the airflow control portion 70 according to a third mode (S130).

Figure 17:
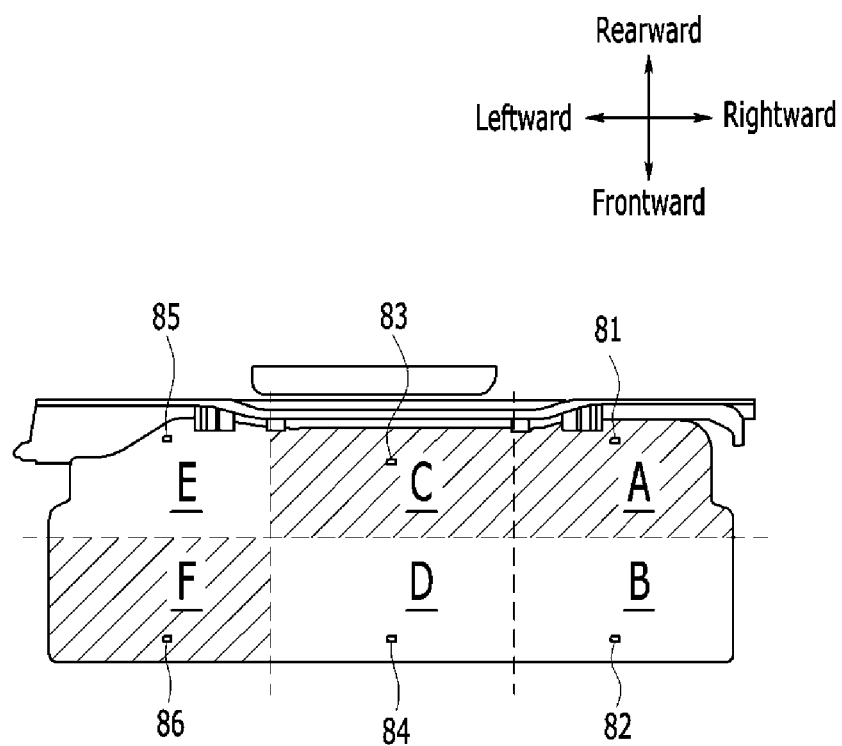

As shown in FIG. 17, in the third mode, the air supplied into the A, C, and F region pad portions A, C, and F is relatively more than the air supplied into the B, D, and E region pad portions B, D, and E by rotating the airflow control portion 70. In the third mode, the air supplied into C region pad portion C may be more than that of the A and F region pad portions A and F, and the air may not be supplied into the B, D, and E pad portions B, D, and E. Assuming that the driver lies on the pad 10 with his head on the right side, when the head and body of driver are positioned at the rear side and the legs are positioned at the front side of the pad 10, the third mode may provide an appropriate temperature environment.

In the S60 stage, if the RC is not positive, the control portion 200 determines whether the RE is positive (S80).

If the RE is not positive, then the control portion 200 controls the airflow portion 70 according to a fourth mode (S140).

Figure 18:
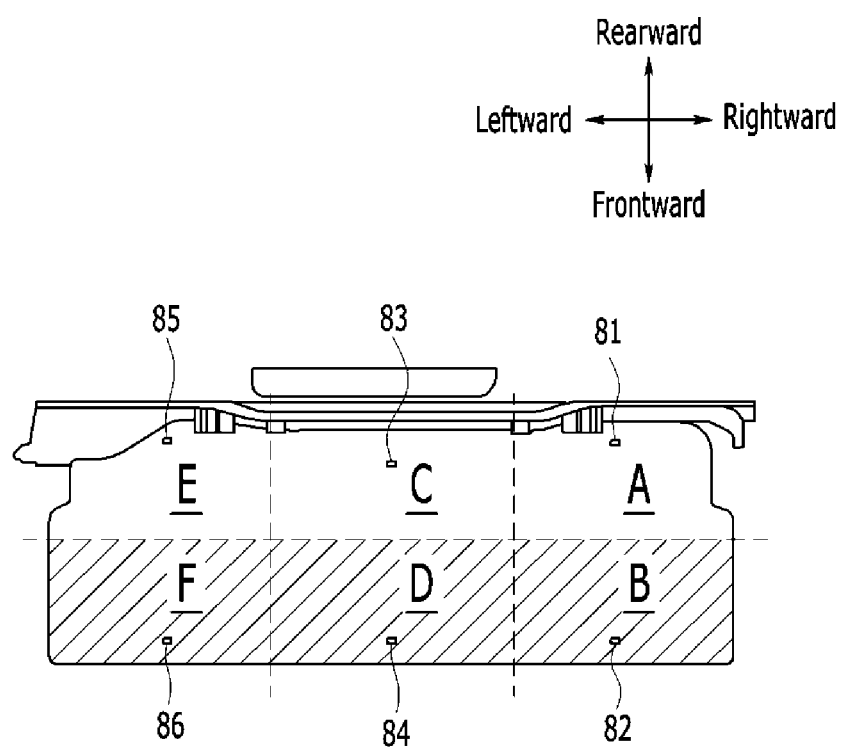

As shown in FIG. 18, in the fourth mode, the air supplied into the B, D, and F region pad portions B, D, and F is relatively more than the air supplied into the A, C, and E region pad portions A, C, and E by rotating the airflow control portion 70.

In the fourth mode, the air supplied into the D region pad portion D may be more than that of the B and F region pad portions B and F, and the air may not be supplied into the A, C, and E pad portions A, C, and E. The fourth mode may provide an appropriate temperature environment when the driver lies on the front side of the pad 10.

In the S80 stage, if the RE is positive, the control portion 200 determines whether the RA is positive (S85).

If the RE is positive, then the control portion 200 controls the airflow portion 70 according to a fifth mode (S150).

Figure 19:
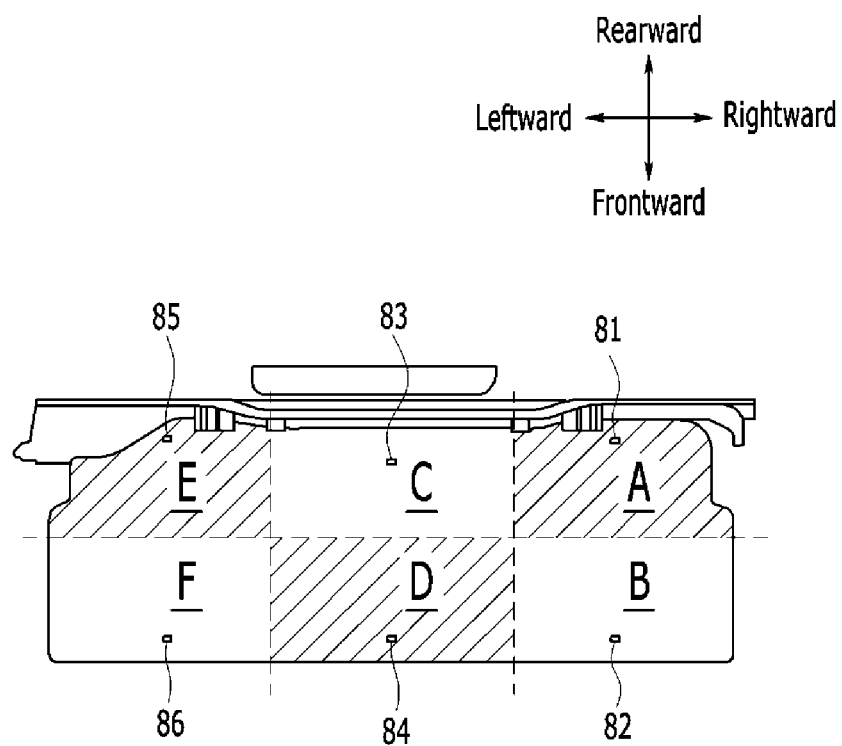

As shown in FIG. 19, in the fifth mode, the air supplied into the A, D, and E region pad portions A, D, and E is relatively more than the air supplied into the B, C, and F region pad portions B, C, and F by rotating the airflow control portion 70. In the fifth mode, the air supplied into the D region pad portion D may be more than that of the A and E region pad portions A and E, and the air may not be supplied into the B, C, and F pad portions B, C, and F. Assuming that the driver lies on the pad 10 with his head on the right side, when the head and legs of the driver are positioned at the rear side and the body is positioned at the front side of the pad 10, the fifth mode may provide an appropriate temperature environment.

In the S85 stage, if the RA is not positive, the control portion 200 controls the airflow control portion 70 according to a sixth mode (S160).

Figure 20:
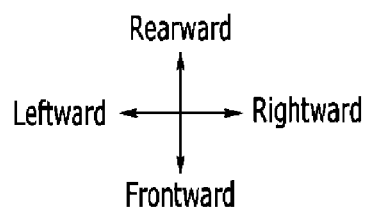
Figure 20:
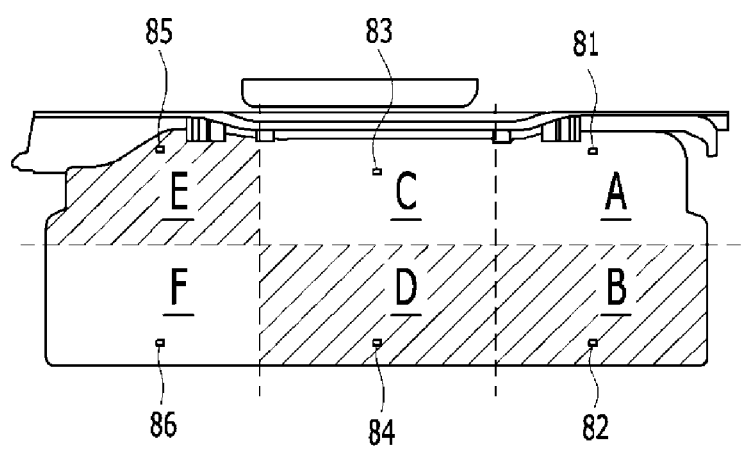

As shown in FIG. 20, in the sixth mode, the air supplied into the B, D, and E region pad portions B, D, and E is relatively more than the air supplied into the A, C, and F region pad portions A, C, and F by rotating the airflow control portion 70. In the sixth mode, the air supplied into the D region pad portion D may be more than that of the B and E region pad portions B and E, and the air may not be supplied into the A, C, and F pad portions A, C, and F. Assuming that the driver lies on the pad 10 with his head on the right side, when the head and body of the driver are positioned at the front side and the legs are positioned at the rear side of the pad 10, the sixth mode may provide an appropriate temperature environment.

Meanwhile, a controlling method of the airflow control apparatus 50 according to various embodiments of the present invention may be continually repeated while pressure is applied on the pad 10.

As described above, the ventilation bed according to various embodiments of the present invention may be operated by the driver in order to cool or heat a local portion thereof without cooling or heating all air in the cabin, thereby the energy loss may be decreased. In addition, an appropriate temperature environment for rest or sleep may be provided by reason of supplying directly cooled or heated air to the driver quickly. Moreover, despite drawing a shade curtain, the driver may receive the cooled or heated air. Thus, convenience thereof may be improved.

According to various embodiments of the present invention, the driver may preset each position of the air supplied from the ventilation bed according to his preference. Therefore, air that satisfies the driver's request may be supplied therein. Further, the driver may take a rest or sleep on the ventilation bed conveniently in the pleasant environment because the cooled or heated air may be automatically supplied to the driver in accordance with the driver's position without additionally operating the ventilation bed.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a ventilation bed comprising an airflow control apparatus configured to selectively deliver a required amount of air supplied from an air conditioning system into a region of a pad divided into a plurality of regions, a switch configured to select at least a portion among the plurality of regions of the pad, an airflow control portion disposed inside of the airflow control apparatus to be rotatable and that regulates a total amount of the air discharged therefrom, the method comprising:

detecting, by a plurality of pressure detecting sensors, whether a pressure is applied on the plurality of regions of the pad or not, when an automatic mode is selected by the switch;

determining a relative pressure ratio value of the plurality of regions of the pad, by a control portion, when the pressure is applied on the pad; and regulating the amount of the air delivered into the plurality of regions by controlling operation of the airflow control portion in accordance with the pressure ratio of the plurality of regions, wherein the pad comprises:

an A region pad portion positioned at a right rear side of the pad;

a B region pad portion positioned at a right front side of the pad;

a C region pad portion positioned at a center rear side of the pad;

a D region pad portion positioned at a center front side of the pad;

an E region pad portion positioned at a left rear side of the pad; and an F region pad portion positioned at a left front side of the pad, and the method further comprises a basic mode, wherein the basic mode is conducted, by the control portion, when an absolute value of a difference value between a pressure ratio of the C region pad portion and a pressure ratio of the D region pad portion is lower than a first predetermined value, when an absolute value of a differential value between a pressure ratio of the A region pad portion and a pressure ratio of the B region pad portion is lower than a second predetermined value, or when an absolute value of a differential value between a pressure ratio of the E region pad portion and a pressure ratio of the F region pad portion is lower than a third predetermined value, wherein, in the basic mode, the air at a predetermined temperature is respectively distributed into the A, C, and E region pad portions and the B, D, and F region pad portions equally.

2. The method of claim 1, further comprising a first mode, wherein the first mode is conducted by the control portion when the absolute value acquired by subtracting the pressure ratio of the D region pad portion from that the pressure ratio of the C region pad portion is greater than the first predetermined value, when the absolute value acquired by subtracting the pressure ratio of the B region pad portion from the pressure ratio of the A region pad portion is greater than the second predetermined value, or when the absolute value acquired by subtracting the pressure ratio of the F region pad portion from the pressure ratio of the E region pad portion is greater than the third predetermined value, and wherein, in the first mode, the air supplied into the A, C, and E region pad portions is more than the air supplied into the B, D, and F region pad portions.

3. The method of claim 2, further comprising a second mode, wherein the second mode is conducted by the control portion when the absolute value acquired by subtracting the pressure ratio of the D region pad portion from the pressure ratio of the C region pad portion is greater than the first predetermined value, when the absolute value acquired by subtracting the pressure ratio of the E region pad portion from the pressure ratio of the F region pad portion is greater than the third predetermined value, and when the absolute value acquired by subtracting the pressure ratio of the A region pad portion from the pressure ratio of the B region pad portion is greater than the second predetermined value, and wherein, in the second mode, the air supplied into the B, C, and F region pad portions is more than the air supplied into the A, D, and E region pad portions.

4. The method of claim 1, further comprising a mode, wherein the mode is conducted by the control portion when the absolute value acquired by subtracting the pressure ratio of the D region pad portion from the pressure ratio of the C region pad portion is greater than the first predetermined value, when the absolute value acquired by subtracting the pressure ratio of the E region pad portion from the pressure ratio of the F region pad portion is greater than the third predetermined value, and when the absolute value acquired by subtracting the pressure ratio of the B region pad portion from the pressure ratio of the A region pad portion is greater than the second predetermined value, and wherein, in the mode, the air supplied into the A, C, and F region pad portions is relatively more than the air supplied into the B, D, and E region pad portions.

5. The method of claim 1, further comprising a mode, wherein the mode is conducted by the control portion, when the absolute value acquired by subtracting the pressure ratio of the C region pad portion from the pressure ratio of the D region pad portion is greater than the first predetermined value, when the absolute value acquired by subtracting the pressure ratio of the A region pad portion from the pressure ratio of the B region pad portion is greater than the second predetermined value, and when the absolute value acquired by subtracting the pressure ratio of the E region pad portion from the pressure ratio of the F region pad portion is greater than the third predetermined value, and wherein in the mode, the air supplied into the B, D, and F region pad portions is relatively more than the air supplied into the A, C, and E region pad portions.

6. The method of claim 1, further comprising a mode, wherein the mode is conducted by the control portion when the absolute value acquired by subtracting the pressure ratio of the C region pad portion from the pressure ratio of the D region pad portion is greater than the first predetermined value, when the absolute value acquired by subtracting the pressure ratio of the F region pad portion from the pressure ratio of the E region pad portion is greater than the third predetermined value, and when the absolute value acquired by subtracting the pressure ratio of the B region pad portion from the pressure ratio of the A region pad portion is greater than the second predetermined value, and wherein in the mode, the air supplied into the A, D, and E region pad portions is more than the air supplied into the B, C, and F region pad portions.

7. The method of claim 1, further comprising a mode, wherein the mode is conducted by the control portion when the absolute value acquired by subtracting the pressure ratio of the C region pad portion from the pressure ratio of the D region pad portion is greater than the first predetermined value, when the absolute value acquired by subtracting the pressure ratio of the F region pad portion from the pressure ratio of the E region pad portion is greater than the third predetermined value, and when the absolute value acquired by subtracting the pressure ratio of the A region pad portion from the pressure ratio of the B region pad portion is greater than the second predetermined value, and wherein in the mode, the air supplied into the B, D, and E region pad portions is more than the air supplied into the A, C, and F region pad portions.

* * * * *